(12) United States Patent
Kim et al.

(10) Patent No.: US 12,219,062 B2
(45) Date of Patent: Feb. 4, 2025

(54) METHOD AND APPARATUS FOR MANAGING NON-FUNGIBLE TOKEN FOR DIGITAL CONTENT

(71) Applicant: Samsung Electronics Co., Ltd., Gyeonggi-do (KR)

(72) Inventors: Bumhan Kim, Gyeonggi-do (KR);
Eunbi Kim, Gyeonggi-do (KR);
Hansang Song, Gyeonggi-do (KR);
Seungwon Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 17/846,574

(22) Filed: Jun. 22, 2022

(65) Prior Publication Data

US 2023/0045546 A1    Feb. 9, 2023

Related U.S. Application Data

(63) Continuation of application No. PCT/KR2022/007266, filed on May 23, 2022.

(30) Foreign Application Priority Data

Aug. 3, 2021 (KR) .................. 10-2021-0102147

(51) Int. Cl.
*H04L 9/32* (2006.01)
*H04L 9/08* (2006.01)

(52) U.S. Cl.
CPC ............ *H04L 9/3213* (2013.01); *H04L 9/083* (2013.01); *H04L 9/3247* (2013.01); *H04L 9/3265* (2013.01); *H04L 2209/603* (2013.01)

(58) Field of Classification Search
CPC ..... H04L 9/3213; H04L 9/083; H04L 9/3247; H04L 9/3265; H04L 2209/603
See application file for complete search history.

(56) References Cited

U.S. PATENT DOCUMENTS

2020/0143015 A1*  5/2020  LeBeau ............... G06Q 20/065
2020/0366480 A1*  11/2020 Noonan ........... G06Q 20/38215
(Continued)

FOREIGN PATENT DOCUMENTS

CN      103164636 B    12/2015
JP      2006-178547 A   7/2006
(Continued)

OTHER PUBLICATIONS

International Search Report Dated Aug. 19, 2022.

*Primary Examiner* — Jeffrey C Pwu
*Assistant Examiner* — Mayasa A. Shaawat
(74) *Attorney, Agent, or Firm* — Cha & Reiter, LLC

(57) ABSTRACT

An electronic device and method are disclosed for managing a non-fungible token (NFT). The electronic device includes: a memory configured to store computer-executable instructions, and a processor. The processor implements the method, including: generating, a NFT for target content in response to receiving a request to register the target content from a first external electronic device, generating, for the NFT, a certification authority (CA) signature indicating that the NFT is generated by the server, and transmitting, via a communication circuitry, the NFT to the first external electronic device, wherein an ownership signature is added to the NFT, together with the CA signature, the ownership signature based on a private key of a user to which ownership of the NFT is assigned.

20 Claims, 7 Drawing Sheets

(56) References Cited

U.S. PATENT DOCUMENTS

2022/0058630 A1* 2/2022 Yantis .................. G06Q 20/387
2022/0069996 A1* 3/2022 Xue ..................... H04L 9/3297

FOREIGN PATENT DOCUMENTS

| JP | 2008-527833 | A | 7/2008 | | |
|---|---|---|---|---|---|
| JP | 2010-506312 | A | 2/2010 | | |
| JP | 4912809 | B2 | 1/2012 | | |
| JP | 2020-68388 | A | 4/2020 | | |
| JP | 6710401 | B1 | 5/2020 | | |
| KR | 10-0568081 | B1 | 3/2006 | | |
| KR | 10-0675286 | B1 | 1/2007 | | |
| KR | 10-0888118 | B1 | 3/2009 | | |
| KR | 10-1294373 | B1 | 8/2013 | | |
| KR | 10-1928087 | B1 | 2/2019 | | |
| KR | 10-2020-0054123 | A | 5/2020 | | |
| KR | 10-2021-0003181 | A | 1/2021 | | |
| WO | 2018/213672 | A1 | 11/2018 | | |
| WO | WO-2021010766 | A1 * | 1/2021 | ........... | H04L 9/0825 |
| WO | WO-2021154384 | A1 * | 8/2021 | ......... | H04L 63/0823 |

* cited by examiner

METHOD AND APPARATUS FOR MANAGING NON-FUNGIBLE TOKEN FOR DIGITAL CONTENT

CROSS-REFERENCE TO RELATED APPLICATIONS

This application is a Continuation application of International Application No. PCT/KR2022/007266 designating the United States, filed on May 23, 2022, at the Korean Intellectual Property Receiving Office and claiming priority to Korean Patent Application No. 10-2021-0102147, filed on Aug. 3, 2021, at the Korean Intellectual Property Office, the disclosures of which are incorporated by reference herein in their entireties.

BACKGROUND

1. Technical Field

The disclosure relates to a method and apparatus for managing a non-fungible tokens (NFTs), and, more particularly, to enabling centralized generation and transacting of NFTs without the use of blockchains.

2. Description of Related Art

A non-fungible token (NFT) is a unique recognition value given to digital content using blockchain technology. NFTs are generally created using the "Ethereum protocol of ERC-721. Unlike existing cryptocurrencies, NFTs are not generally exchangeable. NFTs are accordingly scarce because processes for providing 1:1 transactions have not yet been established. It is suggested that irreversible transactions may be possible. Data structures such as video, image, and music files can be copied in large quantities, it may be difficult if not impossible to identify an original copy of the data. In contrast, it is possible to track and prove that a particular NFT is the original, because ownership information and/or transfer history is stored in the blockchain corresponding to that NFT. However, computer processing cost and time for a chain may increase, as chains continually grow in size with successive transactions. Therefore, fees may be incurred when the existing blockchain mainnet is used. Even if an independent mainnet is configured, the barriers to entry may be very high due to technical and cost issues. In addition, widespread implementation of blockchain technology produces a sizable amount of energy usage, which contributes to environmental pollution. Accordingly, there is a need for a system capable of generating and managing NFTs in which scarcity, uniqueness, and/or transparency are authenticatable, without utilization of a blockchain.

SUMMARY

According to an example embodiment, a method of managing a non-fungible token (NFT) for content, as performed by an electronic device, includes: generating, via at least one processor, an NFT for target content in response to receiving a request to register the target content from a first external electronic device, generating, for the NFT, a certification authority (CA) signature indicating that the NFT is generated by the server, and transmitting, via a communication circuitry, the NFT to the first external electronic device, wherein an ownership signature is added to the NFT, together with the CA signature, the ownership signature based on a private key of a user to which ownership of the NFT is assigned.

According to an example embodiment, an apparatus for managing a non-fungible token (NFT) is disclosed, including: a memory configured to store computer-executable instructions, a processor, communicable coupled to the memory, wherein the computer-executable instructions are executable by the processor to cause the apparatus to: generate the NFT for target content, in response to receiving a request to register the target content from a first external electronic device, generate a certification authority (CA) signature for addition to the NFT, indicating that the NFT is generated by the apparatus, and transmit, via a communication circuitry, the NFT to the first external electronic device, wherein an ownership signature is added to the NFT, together with the CA signature, the ownership signature based on a private key of a user to which ownership of the NFT is assigned.

According to an example embodiment, a non-transitory computer readable storage medium storing instructions is disclosed. The instructions are executable by a computer processor to: generate, via at least one processor, an NFT for target content in response to receiving a request to register the target content from a first external electronic device, generate, for addition to the NFT, a certification authority (CA) signature indicating that the NFT is generated by the server, and transmit, via a communication circuitry, the NFT to the first external electronic device, wherein an ownership signature is added to the NFT, together with the CA signature, the ownership signature based on a private key of a user to which ownership of the NFT is assigned.

According to an example embodiment, a system for managing an NFT for content may include an electronic device configured to transmit a request to register target content, and a server configured to generate an NFT for target content in response to receiving a request to register the target content from an electronic device, obtain an NFT to which a CA signature is added, indicating that the generated NFT is generated by the server, and transmit an NFT to which an ownership signature based on a private key of a user who is to have ownership of the NFT is additionally added together with the CA signature.

According to an example embodiment, the system for managing an NFT may generate and manage an NFT without usage of a blockchain. According to an example embodiment, the system for managing an NFT may use multi-signature-based technology instead of blockchain-dependent NFT generation and management technology. This may resolve the energy and management issues involved in using blockchain technology, while providing maintaining the trackability and authenticatable features of existing NFTs. According to an example embodiment, the system for managing an NFT as disclosed may therefore protect digital assets corresponding to the NFT through a trusted certification authority and a verified system. Further, the system for managing an NFT according to an example embodiment may be operated quickly and efficiently by utilizing various additional functions and security functions, without dependence upon a blockchain.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
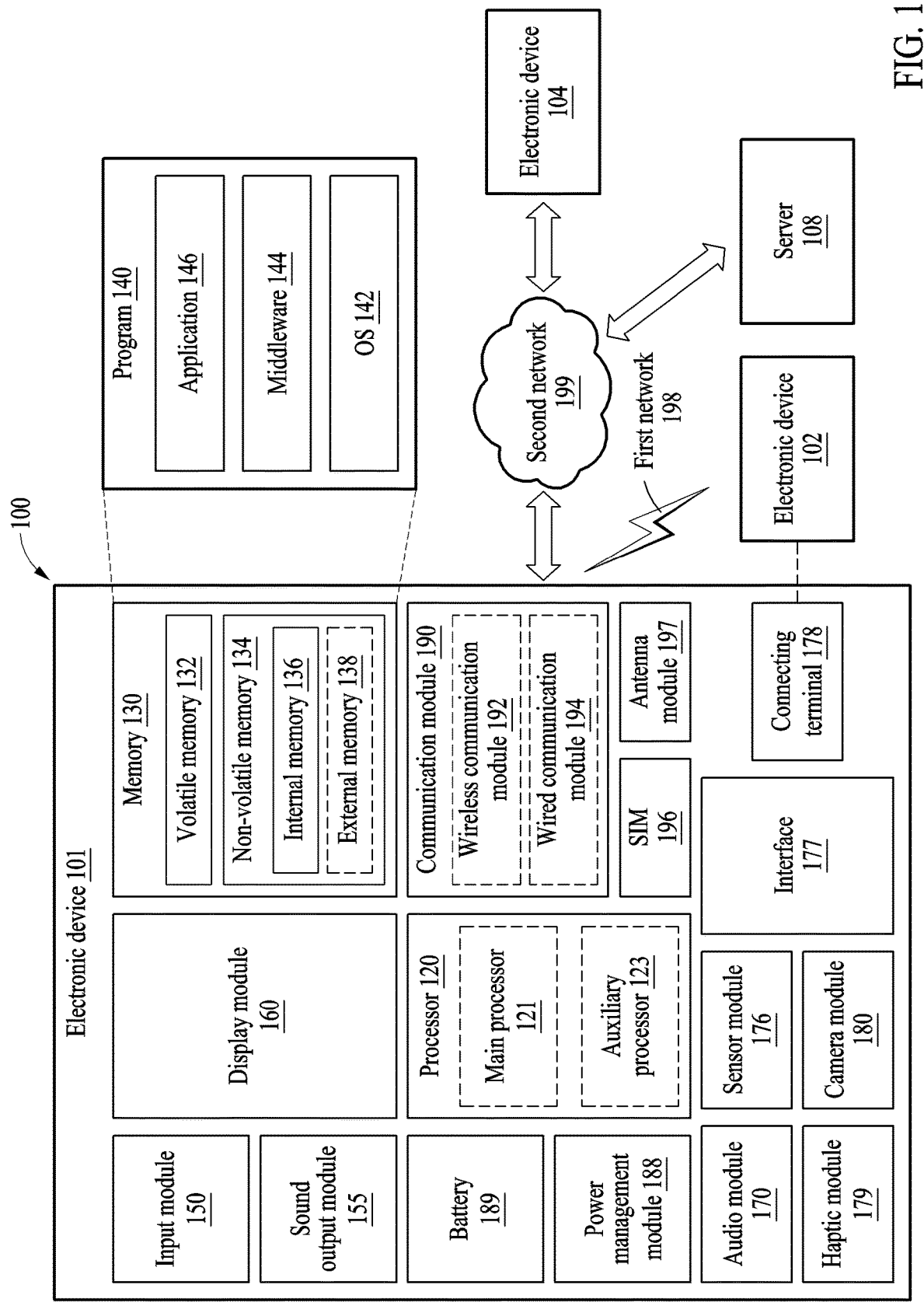
FIG. 1 is a block diagram illustrating an example electronic device in a network environment 100 according to various example embodiments.

Hereinafter, example embodiments will be described in detail with reference to the accompanying drawings. When describing the example embodiments with reference to the accompanying drawings, like reference numerals refer to like components and any repeated description related thereto will be omitted.

FIG. 1 is a block diagram illustrating an electronic device 101 in a network environment 100 according to various example embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence (AI) model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force applied by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various specifications for the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be the same in type as electronic device 101 or different in type than electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may transmit a request to the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, for example, distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used the present disclosure are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same manner or in a similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
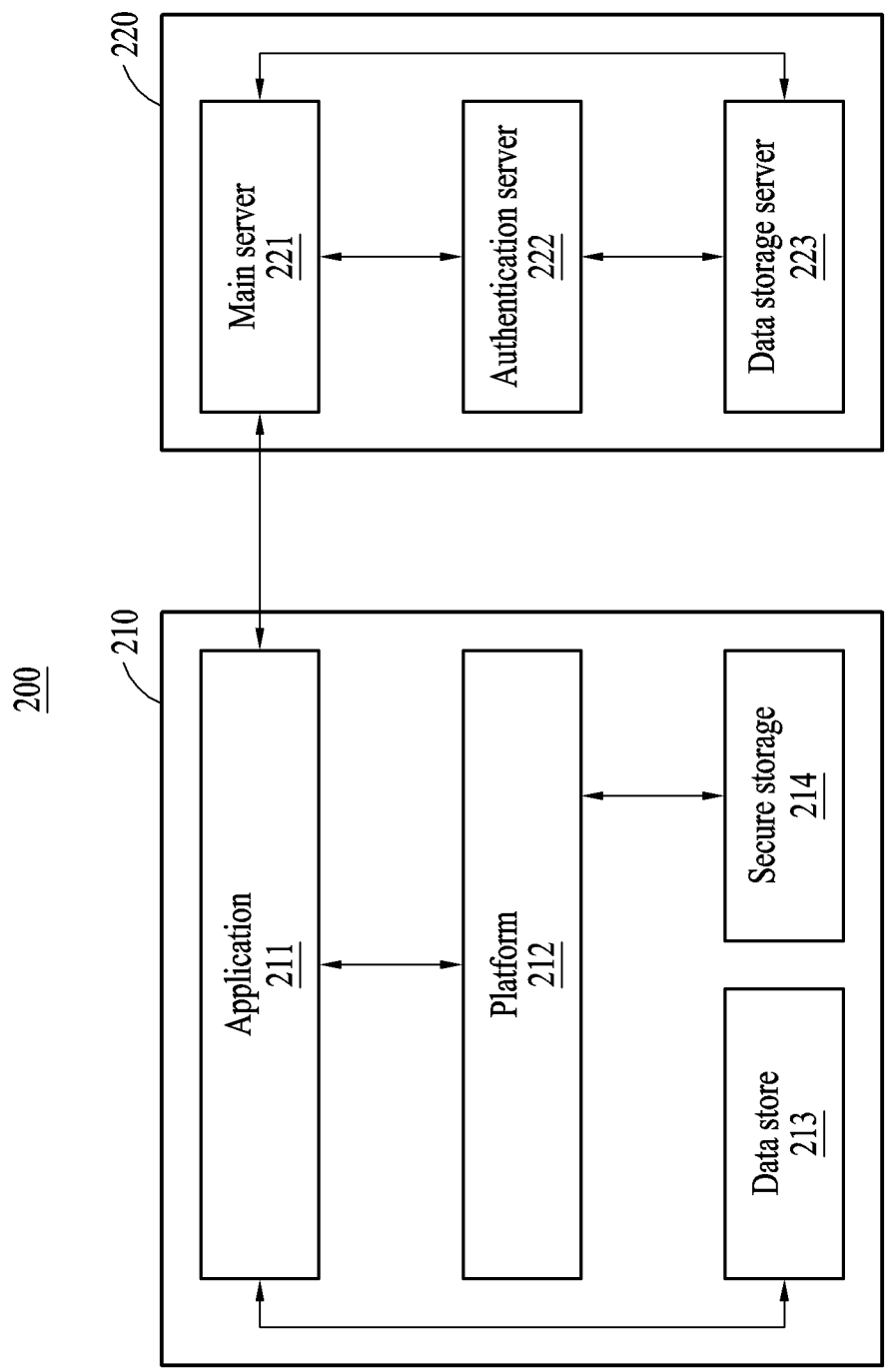
FIG. 2 is a diagram illustrating an example system for managing a non-fungible token (NFT) for content according to an example embodiment.

FIG. 2 is a diagram illustrating an example system for managing a non-fungible token (NFT) for content according to an example embodiment.

A system 200 for managing an NFT may be a system that can verify an owner of digital content and enable transactions involving the same between consumers. The system 200 for managing an NFT may issue an NFT corresponding to digital content, and may enable anyone to verify an owner of the digital content. Since the system for managing an NFT can issue the NFT for the digital content, only a creator of the digital content or a subsequent purchaser of the digital content will be able to lay claim ownership of the content.

Traditionally, an NFT is generated and managed using blockchain technology. However, when the blockchain technology is used, energy is wasted in mining blocks, which contributes to carbon emissions and environmental degradation. In particular, the various operations involved with a blockchain-based NFT such as generation, verification, and transfer may consume a substantial quantity of energy. In addition, since all transactions are executed permanently in the absence of a central regulatory body, ownership of an NFT acquired through theft of a work or account takeover may be permanently maintained. Hereinafter, a system capable of generating and managing NFTs without using a blockchain to resolve the above-mentioned issues is described.

The system 200 for managing an NFT for digital content may include an electronic device 210 (e.g., the electronic device 101 of FIG. 1) and at least one server 220 (e.g., the server 108 of FIG. 1). The electronic device 210 may include an application 211, a platform 212, a data store 213, and/or a secure storage 214. At least a portion of the components of the electronic device 210 related to the NFT may operate in a security execution environment (SEE). The at least one server 220 may include a main server 221, an authentication server 222, and/or a data storage server 223. The at least one server 220 may include, for example, a cloud server.

First, the application 211 may communicate with the main server 221. The application 211 may provide a user registration function, a function for requesting generation of an NFT for content, and/or a function for displaying the NFT to a user of the electronic device 210. In addition, the application 211 may receive an input from the user of the electronic device through a user interface (UI) (e.g., the display module 160 of FIG. 1), and according to the input received from the user, provide the above-described functions related to the NFT.

The user registration function provided by the application 211 may include handling of a request to the server 220 to create a user account, a request to the platform 212 to generate a private key of the user, and/or a request to the server 220 to issue a certification authority (CA) signed certificate.

The application 211 may transmit the request to the main server 221 to create a user account for the user of the electronic device. The application 211 may receive a request for user information from the main server 221. The application 211 may create a user account in the main server 221 by transmitting the requested user information to the main server 221. The user information may include an identification (ID), password, and personal information of the user which may then be utilized to create the user account. When the user account is created in the main server 221, authentication means of a third party such as a telecommunication company or a joint certificate may be utilized to execute user authentication.

After the user account is created in the main server 221, a private key for the user may be generated by a private key generation technology (e.g., mnemonic technology). According to an example embodiment, the private key of the user may be generated and stored in the electronic device 210. When the private key of the user is stored in the electronic device 210, the private key may be stored in the secure storage 214 of the electronic device. According to another example embodiment, the private key of the user may be generated and stored in the server 220.

The electronic device 210 may request issuance of a certificate by transmitting a certificate signing request (hereinafter, "CSR") to the main server 221. The authentication server 222 may issue a certificate to which a certification authority (CA) signature (hereinafter, "CA" signature) is added, based on a certification authority key. The issued certificate for the user may be stored in the authentication server 222. Also, the issued certificate for the user may be transmitted to the electronic device 210 through the main server 221, and the electronic device 210 may store the received certificate in the secure storage 214.

Further, the application 211 may further provide the user with a device registration function, for registering the electronic device 210 associated with the user account, in the server 220.

Hereinafter, the function for requesting generation of an NFT provided by the application 211 is described. The application 211 may transmit target content selected by the user from among digital content stored in the data store 213, basic metadata for the selected target content (e.g., a title of the target content, a description of the target content, and the like), and user account information to the server 220. The application 211 may transmit a request to the main server 221 to generate an NFT for the target content. The main server 221 may then generate the NFT for the target content responsive to the request to generate the NFT for the target content that is received from the application 211.

A function of displaying the NFT provided by the application 211 may include displaying the NFTs generated and stored in the server 220 through the UI of the electronic device 210.

Further, the application 211 may further provide a function allowing the user of the electronic device to manage information for NFTs owned by the user, and a function for purchasing NFTs owned by other users.

The platform 212 may execute processing requests of the application 211. The platform 212 may perform user authentication, a device authentication request, ownership signing of an NFT, and/or management of the secure storage.

User authentication may verify a user of the electronic device as one having appropriate access to the NFTs, accounts, etc. by confirming an identity of the user. The platform 212 may perform the user authentication through a pin, a pattern, a password, or biometric authentication.

The device authentication request may request a server to verify integrity of the electronic device. The device authentication request may be omitted according to device restrictions or system policies.

The ownership signing of the NFT may add an ownership signature to an NFT generated in response to content. When the ownership signature is added to the NFT, this may facilitate later identification of the owner of the NFT through the signature. The ownership signing of the NFT may be performed in the electronic device 210 or the server 220. For example, when the private key of the user is stored in the electronic device 210, ownership signing based on the private key of the user may be performed in the electronic device 210. As another example, when the private key of the user is stored in the server 220, the ownership signing based on the private key of the user may be performed in the server 220.

Management of the secure storage may involve managing information stored or to be stored in the secure storage. The platform 212 may store and delete user authentication information such as a pin, pattern, password, or biometric authentication information and information derived from the user authentication information in the secure storage 214. In addition, the platform 212 may perform an operation of generating or deleting various keys.

Various digital content may be stored in the data store 213. The application 211 may obtain target content stored in the data store 213 and transmit the target content to the server 220 to request generation of an NFT.

The secure storage 214 may store secure media used for user authentication and NFT signing. User authentication information such as a pin, pattern, password, or biometric authentication information and information derived from the user authentication information may be stored. In addition, the secure storage 214 may store a private key of the user used for signing for ownership of an NFT, and/or a device authentication key used for device authentication. When the secure storage 214 by itself supports a cryptographic operation, the secure storage 214 may directly perform the cryptographic operation using the stored secure medium. For example, when the secure storage 214 itself supports the cryptographic operation, ownership signing based on the private key of the user may be performed in the secure storage 214. Hereinafter, mainly, the cryptographic operation that is performed in the platform 212 is described.

In the electronic device 210, the application 211, the platform 212, and/or the secure storage 214 may be, in some embodiments, separate machines. However, the electronic device 210 is not necessarily limited thereto. For example, the electronic device may be configured to include one application capable of performing all functions provided by the application 211, the platform 212, and the secure storage 214. As another example, the secure storage 214 may be configured to be installed within the platform 212.

The main server 221 may perform a user management function and a function of generating an NFT while communicating with the electronic device 210.

The user management function performed by the main server 221 may include creating and storing a user account and a user profile, and issuing an ID or user identification (UID) for each user. The main server 221 may receive target content and basic metadata for the target content from the electronic device 210. The main server 221 may generate and store final metadata by adding information such as a timestamp to the basic metadata of the received target content. The main server 221 may set a result value calculated by inputting the target content and the final metadata to a token issuance function as a unique value of an NFT. The token issuance function may be a cryptographically secure one-way random function. The token issuance function may be a function designed so that input cannot be predicted based on an output result. The token issuance function may be, for example, a hash function. The hash function may be a function that maps data of an arbitrary length to data of a fixed length.

The main server 221 may transmit the resultant NFT for the generated target content to the authentication server 222. The main server 221 may generate an NFT to which a CA signature is added from the authentication server 222. The main server 221 may transmit the NFT to which the CA signature is added to the electronic device 210, and may receive the NFT after an ownership signature is additionally added to the NFT, as per operations of the electronic device 210.

According to an example embodiment, when the private key of the user is stored in the electronic device 210, the main server 221 may transmit the NFT to which the CA signature is added to the electronic device 210. The electronic device 210 may additionally add the ownership signature of the user to the NFT to which the CA signature is added and which is received from the main server 221. According to another example embodiment, when the private key of the user is stored in the server 220, the authentication server 222 may additionally add the ownership signature of the user to the NFT to which the CA signature is added. Hereinafter, mainly, the ownership signature of the user that is added to the NFT in the electronic device 210 is described.

When an owner of the target content is a plurality of users, the ownership signatures of each of the plurality of users may all be added to the NFT. The NFT to which both the CA signature and the ownership signatures are added, the target content, and the final metadata for the target content may be transmitted to and stored in the data storage server 223.

The authentication server 222 may communicate with the main server 221. The authentication server 222 may perform device authentication, ownership signing, ownership signature authentication, CA signing, and/or CA signature authentication.

Device authentication may verify integrity of the electronic device. A device authentication certificate to which the CA signature of the authentication server is added and a device authentication key to which the CA signature is added may be stored in the electronic device. The authentication server 222 may authenticate the electronic device through a cryptographic authentication scheme between the electronic device and the server using the device authentication key and the certificate chain.

Ownership signing may add an ownership signature of the user to the NFT, to enable authentication of ownership of the NFT. When the private key of the user is stored in the server 220, the authentication server 222 may add the ownership signature to the NFT upon receiving the ownership signature request from the main server 221.

Authentication of ownership may include identifying an owner of the NFT. For example, the authentication server 222 may verify the ownership signature of the NFT after examining the certificate chain, to authenticate ownership of the corresponding NFT.

The CA signing may include adding a CA signature to the NFT to indicate that the NFT is generated by the server 220. The authentication server 222 may add the CA signature to the NFT using a CA key stored in the authentication server 222.

The CA signature authentication may include verifying whether the NFT is generated by the server 220. The authentication server 222 may authenticate that the NFT is generated by the server 220 and has not been tampered with by verifying the CA signature added to the NFT.

The data storage server 223 may store content, metadata for the content, and/or NFTs. For secure storage of data, an interplanetary file system (IPFS) protocol may be used. The IPFS protocol may be a protocol for storing and sharing data in a distributed file system. The data storage server 223 may be directly connected to a web or other server, and may be used to provide content for an NFT to the web or other server.

As described above, the server 220 may be a separately machine from the main server 221, the authentication server 222, and the data storage server 223. However, the server 220 is not necessarily limited thereto. For example, the server 220 may be configured as one server in which the main server 221, the authentication server 222, and the data storage server 223 are integrated. As another example, the main server 221 may perform a function of the authentication server 222 instead. Further, although it is illustrated in FIG. 2 that the electronic device 210 communicates only with the main server 221, the example embodiment is not limited thereto, and the electronic device 221 may be directly connected to the authentication server 222.

Figure 3:
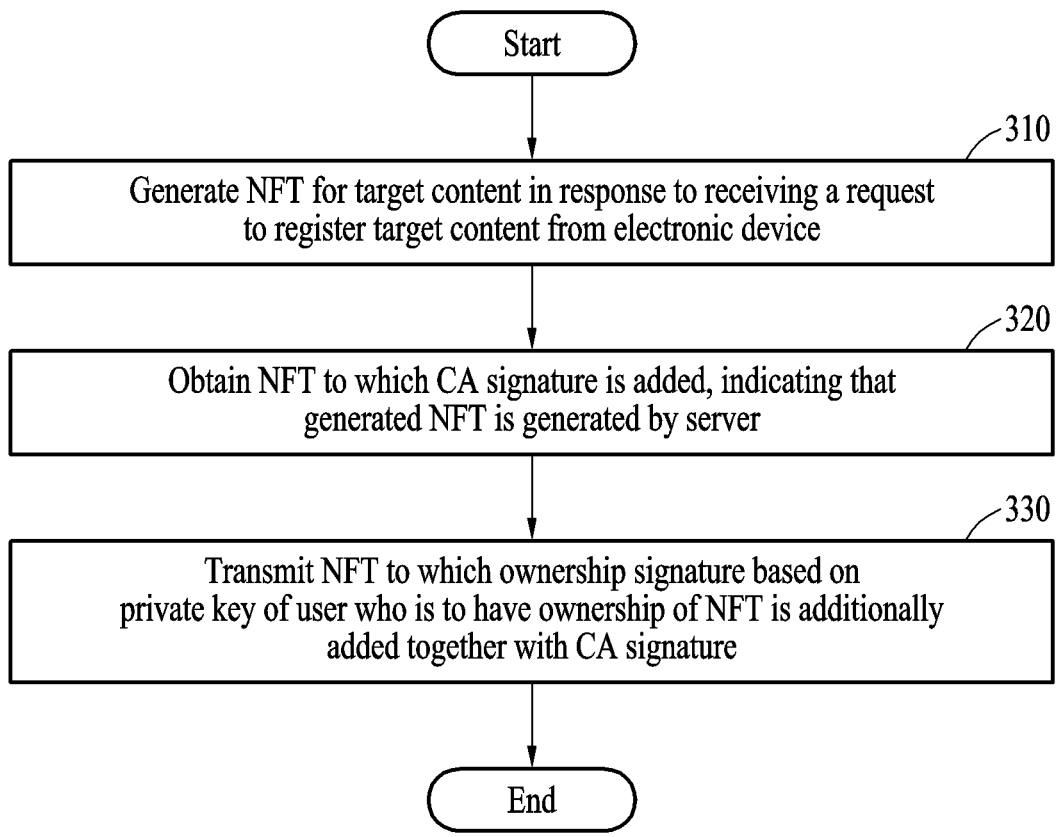
FIG. 3 is a flowchart illustrating an example method of managing an NFT for content performed by a server according to an example embodiment.

FIG. 3 is a flowchart illustrating an example method of managing an NFT for content performed by a server according to an example embodiment.

In operation 310, a main server (e.g., the server 108 of FIG. 1 or the server 220 of FIG. 2) may generate an NFT for some target content, in response to receiving a request to register the target content from an electronic device (e.g., the electronic device 101 of FIG. 1 or the electronic device 210 of FIG. 2). The electronic device and a user of the electronic device may be registered in the server. The electronic device may transmit the request to register the target content to the server. The server may call a token issuance function for issuing an NFT, and may generate the NFT for the target content by using the token issuance function.

In operation 320, the main server may obtain (e.g., generate) a resultant NFT, to which a CA signature is then added, which indicates that the generated NFT is generated by the server. It can thus be verified that the NFT is generated and issued by the server and has not been tampered with, through the CA signature included in the NFT.

In operation 330, the main server may transmit an NFT to another external electronic device. The other device may execute addition of an ownership signature is to the NFT. The ownership signature may be based on a private key of a user who is to have ownership of the NFT. Thus, the NFT may be set to possess both the ownership signature together with the CA signature. As noted above, the ownership signature included in the NFT may be used to identify an owner of the NFT.

The main server may include a memory in which computer-executable instructions are stored and a processor, and the processor may perform the above-mentioned operations 310, 320, and 330.

Hereinafter, an operation of a system for managing an NFT for content is described in more detail.

Figure 4:
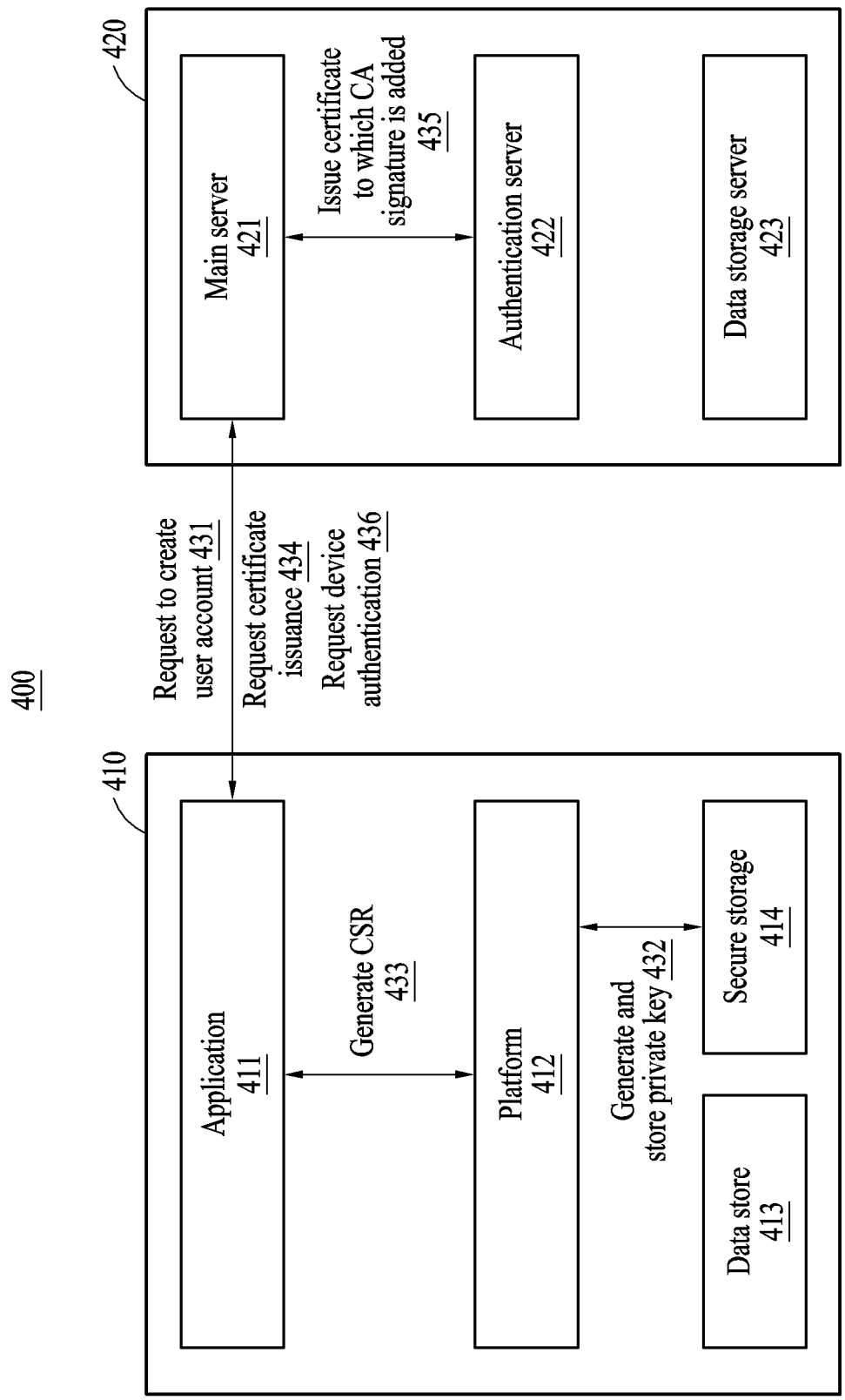
FIG. 4 is a diagram illustrating an example operation in which an electronic device performs user registration according to an example embodiment.

FIG. 4 is a diagram illustrating an example operation in which an electronic device performs user registration according to an example embodiment.

According to an example embodiment, a system 400 for managing an NFT for content may include an electronic device 410 and at least one server 420. The electronic device 410 may include an application 411, a platform 412, a data store 413, and/or a secure storage 414. The at least one server 420 may include a main server 421, an authentication server 422, and/or a data storage server 423. The application 411 may communicate with the main server 421.

The application 411 may provide a user registration function to a user of the electronic device. The user registration function provided by the application 411 may include a request to create a user account in the main server 421, generating a private key of the user in the platform 412, and/or a request to issue a CA signed certificate in the authentication server 422.

Accordingly, in operation 431, the electronic device 410 may transmit a request to the server 420 to create a user account for the user of the electronic device. The application 411 may transmit a request to the main server 421 to create a user account. When the main server 421 receives a user account creation request from the application 411, the main server 421 may request user information from the application 411. The requested user information may include an ID, password, and personal information of the user, that will be utilized for creation of the user account. The application 411 may receive an input from the user of the electronic device through a user interface (UI), which in some embodiments prompts for the specified information. The application 411 may receive the user information requested by the main server 421 from the user via the UI, and may transmit the received user information to the main server 421. The main server 421 may thus create the user account for the user of the electronic device 410 based on the user information received from the application 411.

In operation 432, the electronic device 410 may generate and store a private key for the user. After the user account is created on the main server 421, the platform 412 may generate and store the private key of the user. The platform 412 may generate the private key of the user using a private key generation technique. For example, a mnemonic may be used in the private key generation technique. The platform 412 may transmit the generated private key of the user to the secure storage 414, and the secure storage 414 may store the private key of the user.

In operation 433, the electronic device 410 may generate a public key and a CSR based on the private key of the user. The platform 412 may generate a public key for the user based on the private key of the user. The platform 412 may generate a CSR based on the generated public key of the user. The platform 412 may generate a CSR including the public key of the user. The CSR may be data in a form of a certificate application including information for issuing a certificate.

In operation 434, the electronic device 410 may transmit a certificate issuance request together with the CSR to the server 420. The application 411 may transmit the CSR generated by the platform 412 to the main server 421, and the main server 421 may transmit the CSR to the authentication server 422.

In operation 435, the server 420 may issue a certificate to which a CA signature is added. Since a CA key is stored in the authentication server 422, the authentication server 422 may issue a certificate to which a CA signature is added, that is based on the CA key. The main server 421 may obtain the CA-signed certificate from the authentication server 422. The main server 421 may transmit the CA-signed certificate to the application 411. The CA-signed certificate may be stored in both the electronic device 410 and the server 420. When the CA-signed certificate is stored in the electronic device 410, the certificate may be stored in the secure storage 414.

In operation 436, the electronic device 410 may transmit a request for device authentication to the server 420. When a CA-signed device authentication key is stored in the electronic device 410, the electronic device 410 may transmit a request to the server 420 to authenticate the electronic device 410 using the CA-signed device authentication key. The server 420 may perform the requested device authentication through a cryptographic authentication scheme between the electronic device and the server, using the device authentication key and a certificate chain. Through the device authentication, the server 420 may verify integrity of the electronic device 410 and may specify the electronic device 410. When the device authentication is performed, the server 420 may register the electronic device 410 by mapping it to a user account created for a user of the electronic device.

Figure 5:
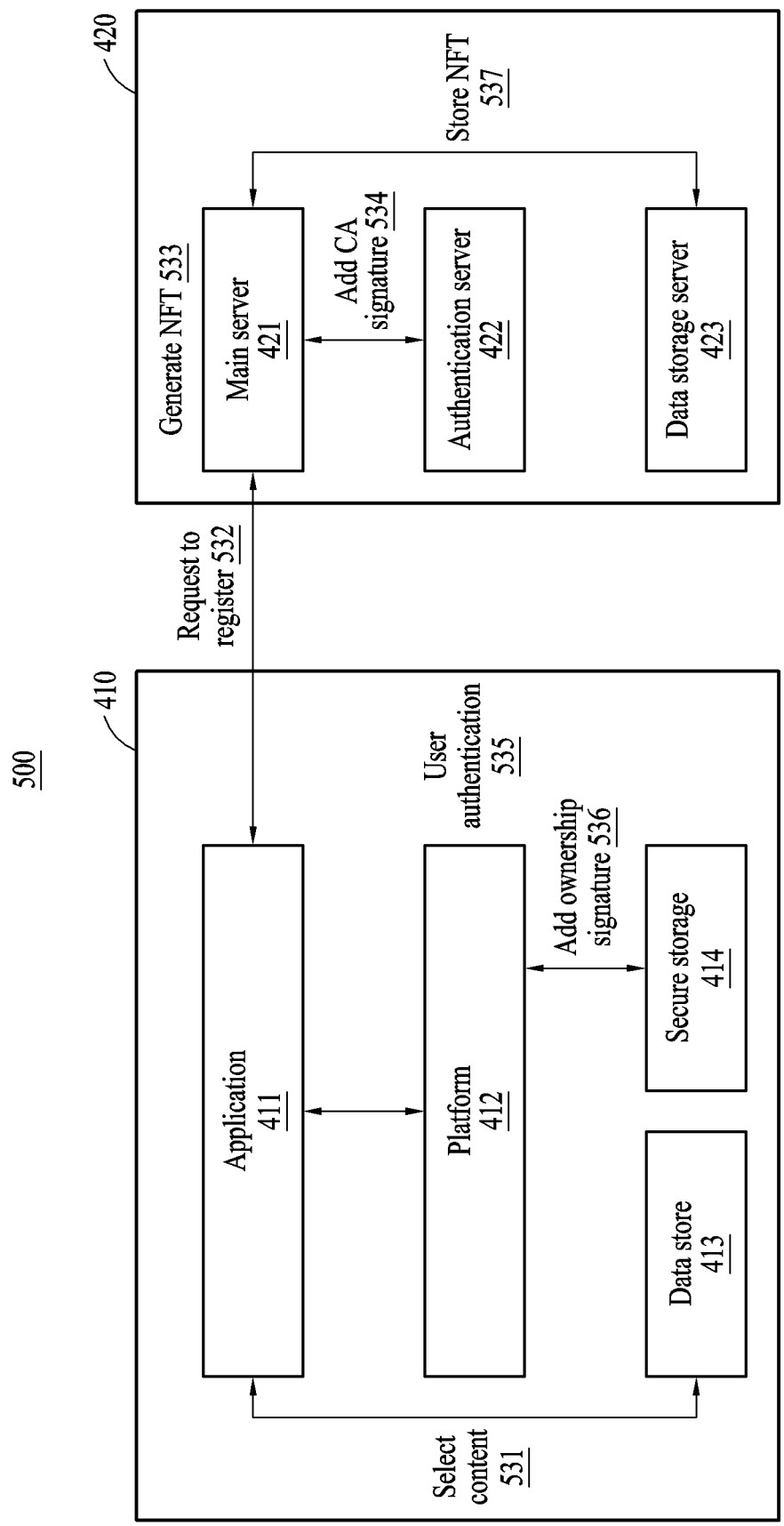
FIG. 5 is a diagram illustrating an example operation in which a server generates an NFT for target content according to an example embodiment.

FIG. 5 is a diagram 500 illustrating an example operation in which a server generates an NFT for target content according to an example embodiment.

In operation 531, the electronic device 410 may select the target content. The NFT will be generated for the target content. The application 411 may retrieve the target content from among content stored in the data store 413, based on an input of a user. For example, the application 411 may display the content retrieved from the data store 413 through a UI. The electronic device may receive an input from the user selecting the target content from among multiple pieces of displayed content. The data store 413 may store not only the content but also basic metadata related to each of the content. The basic metadata for the target content may include certain information about the target content. The metadata information for the target may include, for example, a title of the target content, a description of the target content, and/or a type of the target content (e.g., a photo, a video, and the like). The application 411 may obtain the selected target content from among the content stored in the data store and the basic metadata for the selected target content from the data store 413.

In operation 532, the electronic device 410 may transmit a request to register the target content to the server 420. In response to receiving the request to register the target content, the server 420 may generate an NFT for the target content.

The application 411 may transmit the target content and the metadata for the target content, while transmitting the request to register the target content to the main server 420. In addition, the application 411 may additionally transmit user account information and device information to the main server 421. The user account information may include an ID and password for a user account created on the server. The device information may include a device authentication key stored in the electronic device.

In operation 533, the server 420 may generate the target content and the NFT for the target content. The main server 421 may perform authentication for the user account based on the user account information received from the application 411. The main server 421 may perform authentication for the electronic device 410 based on the device information received from the application 411. According to an example embodiment, after the electronic device performs authentication of the user account, the main server 421 may generate the NFT for the target content. According to another example embodiment, after the electronic device performs authentication of the user account and the electronic device, the main server 421 may generate the NFT for the target content.

The main server 421 may call a token issuance function for issuing an NFT. The token issuance function may include a cryptographically secure one-way random function. The main server 421 may generate and store final metadata by adding information to the basic metadata of the target content received from the application 411. The main server 421 may generate the NFT for the target content based on the target content and the final metadata for the target content. More specifically, the main server 421 may input the target content and the final metadata for the target content to the token issuance function, and set a calculated result value as a unique value of the NFT for the target content.

In operation 534, the server 420 may add a CA signature to the NFT, and transmit the updated NFT to the electronic device 410.

That is, more specifically, the main server 421 of the server 420 may transmit the NFT to the authentication server 422 of the server 420. The authentication server 422 may add the CA signature to the NFT for the target content received from the main server 421, using a pre-stored CA key. When the CA signature is added to the NFT, it can thus be verified thereafter that the NFT was generated by the server 420. The main server 421 may then receive the updated NFT to which the CA signature is added from the authentication server 422. The main server 421 may transmit the updated NFT back to the application 411 for ownership signing.

In operation 535, the electronic device 410 may perform user authentication in order to add an ownership signature based on a private key of the user to the NFT to which the certification authority signature is added.

The application 411 may receive the NFT to which the certification authority signature is added from the main server 421. The platform 412 may perform user authentication to add an ownership signature based on the private key of the user to the NFT. The user authentication may include an operation of determining whether an authentication input received from the user matches authentication information that is previously stored and associated with the user. The authentication input and authentication information may be, for example, one of a pin, a pattern, a password, and a fingerprint of the user, but is not limited thereto.

In operation 536, when the user authentication is successfully completed (e.g., the user's identity is verified), the electronic device 410 may add the ownership signature based on the private key of the user to the NFT, and may transmit the NFT (now including the ownership signature) to the server 420.

The platform 412 may obtain the private key of the user stored in the secure storage 414 in response to the user authentication being performed. The platform 412 may additionally add the ownership signature based on the private key of the user to the NFT to which the CA signature is added and which is received from the server. When the ownership signature is added to the NFT for the target content, it can be authenticated that the ownership of the NFT belongs to the user of the electronic device 410. The application 411 may obtain the NFT to which the ownership signature based on the private key of the user who is to have the ownership of the NFT is additionally added together with the CA signature from the platform 412, and may transmit the obtained NFT to the main server 421.

In operation 537, the server 420 may verify the ownership signature included in the NFT received from the electronic device 410 and store the verified NFT.

When the user authentication is performed in the electronic device, the main server 421 may receive the NFT to which the ownership signature based on the private key of the user is additionally added from the application 411. The authentication server 422 may verify the ownership signature added to the NFT received from the application 411. The authentication server 422 may verify the ownership signature included in the NFT with a certificate for the user of the electronic device stored in the authentication server 422. The authentication server 422 may verify the ownership signature of the user included in the NFT by using a public key of the user included in the certificate. When the ownership signature included in the NFT is verified by the authentication server 422, the data storage server 423 may store the verified NFT in association with the target content.

Figure 6:
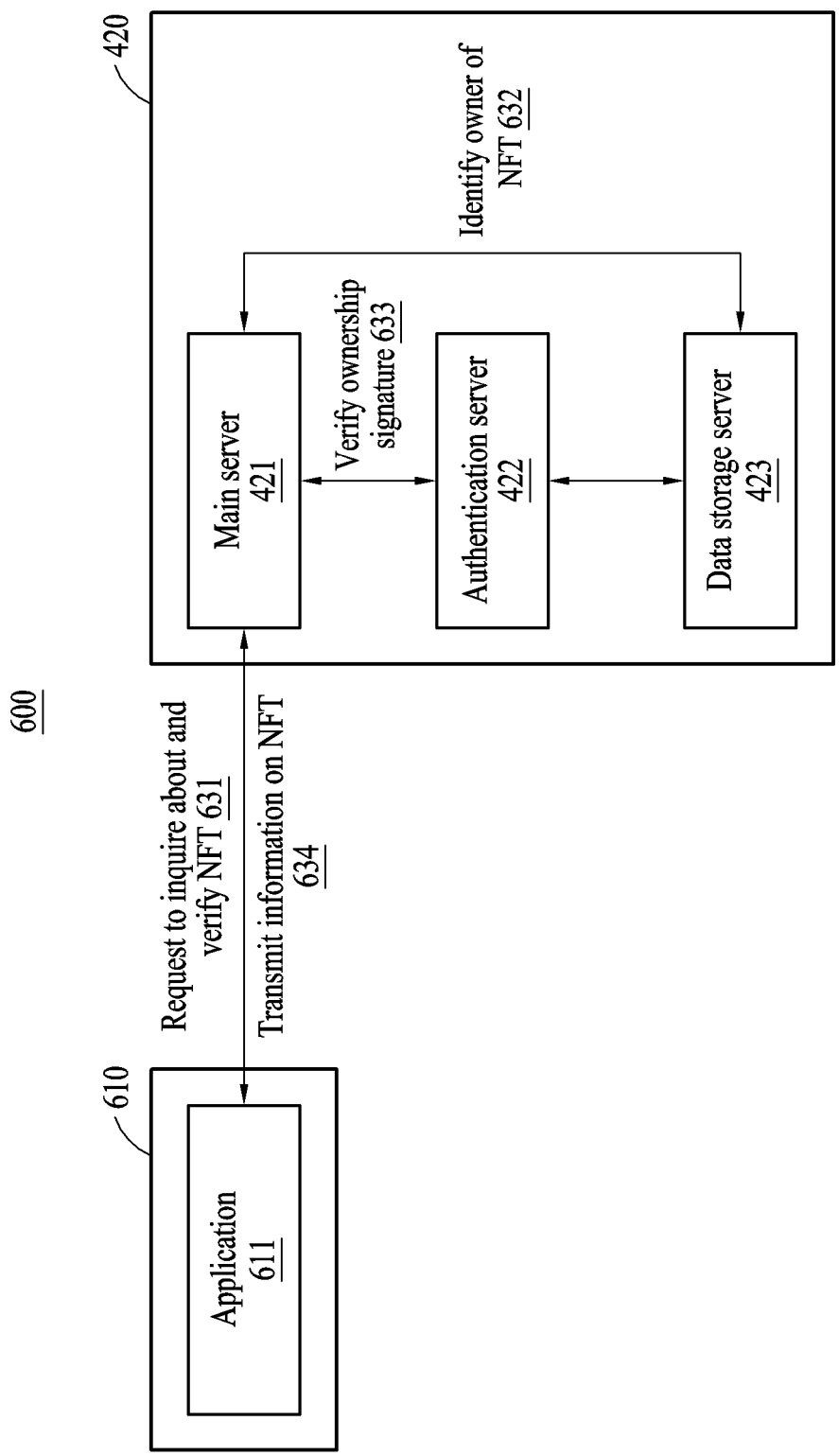
FIG. 6 is a diagram illustrating an example operation in which a server verifies an owner of an NFT of target content by using an ownership signature, according to an example embodiment.

FIG. 6 is a diagram 600 illustrating an example operation in which a server verifies an owner of an NFT of target content by using an ownership signature, according to an example embodiment.

According to an example embodiment, when a request to verify the NFT of the target content is received (631), the server may identify an owner of the NFT by verifying an ownership signature included in the NFT.

In operation 631, an electronic device 610 may transmit a request to the server 420 for verification of the NFT.

The electronic device 610 may be identical to, or different from an electronic device (e.g., the electronic device 410 of FIG. 4 or 5) that previously requested registration of the target content. According to an example embodiment, an application 611 may transmit a request to the main server 421 to inquire about and verify the NFT for the target content, by receiving an input selecting the target content from a user. According to another example embodiment, the application 611 may receive an address of the NFT for the target content from the user or a quick response (QR) code indicating the address of the NFT for the target content as the input requesting (i.e., inquiring) verification of the NFT for the target content by the main server 421.

The application 611 may request verification of the NFT while transmitting the target content to the main server 421. In another example embodiment, the application 611 may request verification of the NFT for the target content while transmitting one or more of the address of the NFT for the target content to the main server 421, and/or the QR code indicating the corresponding address to the main server 421.

In operation 632, the server 420 may identify the owner of the NFT based on metadata stored for the target content from pre-stored data.

The main server 421 may receive a request for verification of the NFT for the target content. The main server 421 may execute a search for information corresponding to the NFT by determining whether information received from the application 611 matches any information stored in the data storage server 423. For example, the main server 421 may determine whether the target content received from the application 611 corresponds to and/or matches information registered in the data storage server 423. In another example, the main server 421 may determine whether metadata corresponding to the address or QR code of the NFT for the target content received from the application 611 is stored in the data storage server 423.

The main server 421 may identify the owner of the NFT based on ownership history information mapped to the target content and stored in the data storage server 423. When an inquiry about the NFT for the target content is made to the data storage server 423, the main server 421 may identify a current owner of the NFT of the target content from metadata for the target content stored in the data storage server 423. Since the metadata for the target content includes the ownership history information of the NFT, the current owner of the NFT may be identified by checking the metadata for the target content. The ownership history information may be an owner change history for the NFT.

In operation 633, the server 420 may identify the owner of the NFT by verifying the ownership signature included in the NFT for the target content.

When the current owner of the NFT for the target content is identified according to the ownership history information, the main server 421 may verify the ownership signature included in the NFT. The authentication server 422 may store a certificate for the current owner of the NFT. Accordingly, the authentication server 422 may verify the ownership signature included in the NFT using the certificate of the current owner stored in the authentication server 422. The authentication server 422 may verify the ownership signature based on a public key of the owner included in the certificate of the current owner. The main server 421 may confirm that the current owner has the ownership of the NFT through verification of the ownership signature.

In operation 634, the server 420 may transmit information (e.g., results of the verification operation) on the NFT for the target content, for which a request for verification is transmitted to the electronic device 610.

The main server 421 may transmit information on the NFT for the target content for which a request for verification is transmitted to the application 611. The main server 421 may transmit the target content, the NFT of which the ownership signature is successfully verified, an ID of the current owner of the NFT, and/or the ownership history information of the NFT to the application 611. The application 611 may display the information received from the main server 421 on the user interface of the electronic device 610.

Figure 7:
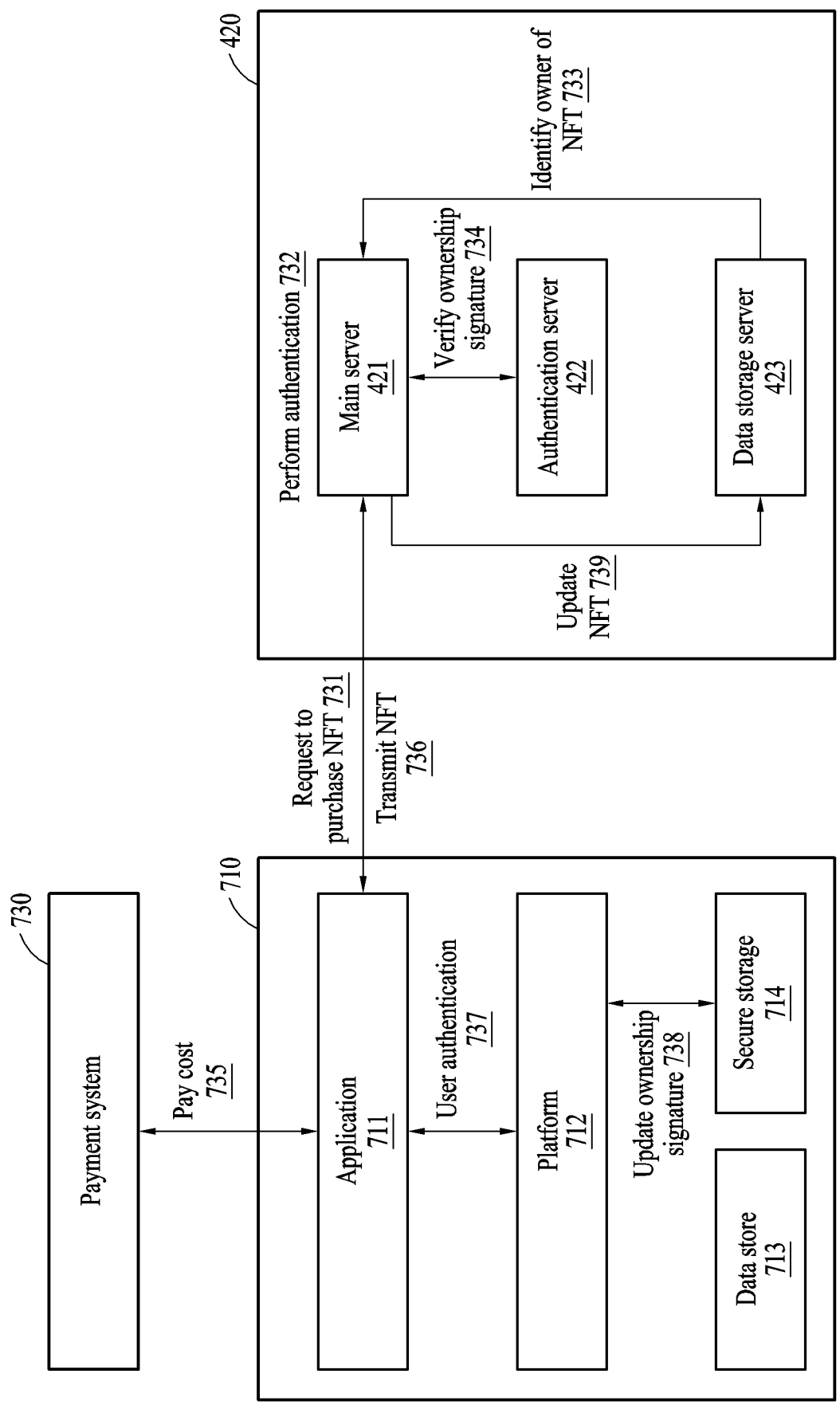
FIG. 7 is a diagram illustrating an example operation in which a server transfers ownership of an NFT of target content by using an ownership signature, according to an example embodiment.

FIG. 7 is a diagram illustrating an example operation in which a server transfers ownership of an NFT of target content by using an ownership signature (e.g., as part of a purchase and sale of the NFT), according to an example embodiment.

According to an example embodiment, the server 420 may transfer ownership of an NFT of target content by using an ownership signature. When the server 420 receives a purchase request for the NFT of the target content from an electronic device 710, the server 420 may transmit the NFT to the electronic device 710 of another user.

According to an example embodiment, the server 420 may receive, from the electronic device 710 of the other user, the NFT from which an ownership signature of a preceding owner is removed, and to which an ownership signature of the new user is added. According to another example embodiment, the server 420 may receive, from the electronic device 710 of the other user, the NFT to which an ownership signature of a new owner is additionally added, while an ownership signature of an existing, preceding owner is maintained.

The server 420 may verify the ownership signature of the new owner added to the NFT using a public key of the new user, and when verification is successful, the server 420 may update and store the corresponding NFT. For example, when the server 420 receives the NFT, to which the ownership signature of a new owner is additionally added while the ownership signature of the preceding owner is maintained, the server 420 may verify the ownership signature of the new owner, by determining a most recently added ownership signature as the updated ownership signature.

In operation 731, the electronic device 710 may transmit a request to purchase the NFT of the target content to the server 420.

The electronic device 710 may including an electronic device (e.g., the electronic device 410 of FIG. 4 or 5) that transmits a request to register target content and an electronic device (e.g., the electronic device 610 of FIG. 6) that requests an inquiry about and verification for an NFT of the target content, or a different electronic device. The application 711 may receive a selection input for the target content from the user for purchasing the NFT for the target content.

The application 711 may transmit the request to purchase the NFT of the target content to the main server 421. The application 711 may request the purchase of the NFT for the target content while transmitting user account information of the electronic device 710 to the main server 421. The application 711 may also transmit information about the electronic device 710 to the main server 421.

In operation 732, the server 420 may perform authentication of a user account and authentication of device information based on the user account information and device information received from the electronic device 710.

The main server 421 may perform authentication for the user account for the user of the electronic device 710 based on the user account information received from the application 711. The main server 421 may perform authentication for the electronic device 710 based on the device information received from the application 711.

In operation 733, the server 420 may identify an owner of the NFT based on metadata for the target content that is included among pre-stored data. Operation 733 may be performed in a manner similar to the manner in which operation 632 of FIG. 6 is performed.

The main server 421 may identify the owner of the NFT based on ownership history information that is mapped to the target content and stored in the data storage server 423.

The main server 421 may identify a current owner of the NFT of the target content from the metadata for the target content stored in the data storage server 423. The main server 421 may identify the current owner of the NFT based on the ownership history information of the target content included in the metadata for the target content.

In operation 734, the server 420 may verify the ownership signature of the NFT with a certificate of the current owner of the NFT.

When the current owner of the NFT for the target content is identified, the main server 421 may determine successful verification of the ownership signature of the NFT. The authentication server 422 may pre-store the certificate of the current owner of the NFT. The authentication server 422 may verify the ownership signature included in the NFT using the certificate of the current owner stored in the authentication server 422. The main server 421 may obtain a result of the verification of the ownership signature from the authentication server 422, and transmit the results of the verification of the ownership signature to the application 711.

In operation 735, the electronic device 710 may be operably coupled to a payment system 730 to pay for an NFT to be purchased.

When the ownership signature of the NFT for the target content is successfully verified in the main server 421, the application 711 may execute a payment transaction corresponding to the purchase of the NFT to the payment system 730 linked to the electronic device 710. The cost to purchase the NFT may be recorded in the metadata for the target content. The main server 421 may transmit purchase cost information for the NFT while transmitting the verification result of the ownership signature included in the NFT to the application 711. The user of the electronic device 710 may pay a cost to purchase the NFT through the payment system 730 through the application 711. When the user of the electronic device 710 pays the cost to purchase the NFT through the application 711, the payment system 730 or the application 711 may transmit, to the main server 421, the information that the cost to purchase the NFT has been paid.

In operation 736, the server 420 may transmit the NFT for the target content to the electronic device 710 to complete the transfer of ownership.

When the main server 421 receives an indication that the purchase transaction for the NFT is complete by the application 711, the main server 421 may transmit the NFT for the target content to the application 711 for ownership transfer.

In operation 737, the electronic device 710 may perform a user authentication to update the ownership signature in the NFT received from the server, based on a private key of the user of the electronic device 710.

The application 711 may receive the NFT for the target content from the main server 421. The application 711 may receive the NFT for the target content to which the ownership signature of the existing owner is added. A platform 712 may perform user authentication to update the ownership signature of the NFT with the private key of the user of the electronic device 710. The platform 712 may perform the user authentication through an operation of determining whether an authentication input received from the user of the electronic device 710 matches authentication information stored in advance for the user.

In operation 738, when the user authentication is successful, the electronic device 710 may update the ownership signature in the NFT based on the private key of the user of the electronic device 710, who is the new owner of the NFT, and transmit the NFT for which the ownership signature is updated to the server 420.

The platform 712 may obtain the private key of the user of the electronic device 710 stored in a secure storage 714 (e.g., rather than data store 713), in response to the user authentication being performed. The platform 712 may remove the ownership signature of the existing owner included in the NFT received from the main server 421, and add the ownership signature based on the private key of the user of the electronic device 710. The application 711 may obtain the NFT of which the ownership signature is updated by using the private key of the user of the electronic device 710 from the platform 712, and transfer the obtained NFT to the main server 421.

In operation 739, the server 420 may verify the ownership signature included in the NFT received from the electronic device 710, and when the ownership signature is verified, the NFT of which the ownership signature is updated may be updated and stored.

When the user authentication is performed in the electronic device 710, the main server 421 may receive the NFT of which the ownership signature is updated based on the private key of the user of the electronic device 710 from the electronic device 710. The authentication server 422 may verify the ownership signature of the NFT received from the application 711. Specifically, the authentication server 422 may verify the renewed ownership signature of the NFT. The authentication server 422 may verify the ownership signature included in the NFT with the certificate of the user of the electronic device 710 stored in the authentication server 422. The authentication server 422 may verify the ownership signature by using the public key included in the certificate of the user of the electronic device 710. When the ownership signature of the NFT is verified, the main server 421 may transmit the corresponding NFT to the data storage server 423 to update and store the corresponding NFT as the NFT linked to the target content. In addition, the main server 421 may update the ownership history information for the target content stored in the data storage server 423 so that the current owner of the NFT for the target content may become the user of the electronic device 710.

According to an example embodiment, a method of managing an NFT for content performed by a server may include generating an NFT for target content in response to receiving a request to register the target content from an electronic device, obtaining an NFT to which a CA signature is added, indicating that the generated NFT is generated by the server, and transmitting an NFT to which an ownership signature based on a private key of a user who is to have ownership of the NFT is additionally added together with the CA signature.

According to an example embodiment, the method of managing the NFT for the content performed by the server may further include generating a user account based on user information received from the electronic device, and the generating of the NFT for the target content may include generating the NFT for the target content after authentication of the user account is performed by the electronic device.

The generating of the user account may include transmitting a certificate to which the CA signature is added to the electronic device, in response to receiving a CSR generated based on a public key of the user from the electronic device.

The obtaining of the NFT may include transmitting the NFT to which the CA signature is added to the electronic device, and receiving, from the electronic device, the NFT to which the ownership signature based on the private key of the user is additionally added, in response to a user authentication being performed in the electronic device.

The generating of the NFT may include receiving the target content and metadata for the target content from the electronic device, and generating the NFT based on a result value calculated by inputting the received target content and the metadata to a token issuance function for issuing an NFT.

According to an example embodiment, the method of managing the NFT for the content performed by the server may further include verifying the ownership signature included in the NFT to identify an owner of the NFT, in response to receiving a request to verify the NFT.

The identifying of the owner of the NFT may include identifying the owner of the NFT based on ownership history information mapped to the target content and stored, and verifying the ownership signature included in the NFT using a certificate of the verified owner.

According to an example embodiment, the method of managing the NFT for the content performed by the server may include, in response to receiving a request to purchase the NFT from an electronic device of another user, transmitting the NFT to the electronic device of the other user, and receiving, from the electronic device of the other user, the NFT from which an ownership signature of an existing owner is removed and to which an ownership signature of the other user is added.

According to an example embodiment, the method of managing the NFT for the content performed by the server may include, in response to receiving a request to purchase the NFT from an electronic device of another user, transmitting the NFT to the electronic device of the other user, and receiving, from the electronic device of the other user, the NFT to which an ownership signature of the other user is additionally added while an ownership signature of an existing owner is maintained.

According to an example embodiment, the method of managing the NFT for the content performed by the server may include, verifying the ownership signature of the other user included in the NFT using a public key of the other user, and in response to the ownership signature included in the NFT being verified, transmitting the NFT to be updated with the NFT for the target content.

According to an example embodiment, an apparatus for managing an NFT for content may include a memory configured to store computer-executable instructions, and a processor configured to generate an NFT for target content in response to receiving a request to register the target content from an electronic device, obtain an NFT to which a CA signature is added, indicating that the generated NFT is generated by a server, and transmit an NFT to which an ownership signature based on a private key of a user who is to have ownership of the NFT is additionally added together with the CA signature.

According to an example embodiment, a system for managing an NFT for content may include an electronic device configured to transmit a request to register target content, and a server configured to generate an NFT for target content in response to receiving a request to register the target content from an electronic device, obtain an NFT to which a CA signature is added, indicating that the generated NFT is generated by the server, and transmit an NFT to which an ownership signature based on a private key of a user who is to have ownership of the NFT is additionally added together with the CA signature.

What is claimed is:

1. A method in an electronic device of managing non-fungible token (NFT) transactions in absence of a blockchain, the method comprising:
    generating, via at least one processor, an NFT for target content in response to receiving a request to register the target content from a first external electronic device;
    generating, for addition to the NFT, a certification authority (CA) signature indicating that the NFT is generated by the electronic device;
    transmitting, via a communication circuitry, the NFT to the first external electronic device, wherein an ownership signature is added to the NFT, together with the CA signature, the ownership signature based on a private key of a user to which ownership of the NFT is assigned; and
    in response to receiving, from a second external electronic device from among a plurality of NFT-related external electronic devices, a request to purchase the NFT, processing, via the at least one processor and the second external electronic device, a transfer of the NFT from a preceding owner to a new owner, in absence of communicative transmissions related to the transfer with a remainder of the plurality of NFT-related external electronic devices.

2. The method of claim 1, further comprising:
    generating a user account based on user information received from the first external electronic device,
    wherein the NFT for the target content is generated after the user account is authenticated by the first external electronic device.

3. The method of claim 2, wherein generating of the user account includes transmitting a certificate, to which the CA signature is added, to the first external electronic device, in response to receiving a certificate signing request (CSR) generated based on a public key of the user from the first external electronic device.

4. The method of claim 1, wherein generating the NFT further comprises:
    after transmitting the NFT to which the CA signature is added to the external electronic device, receiving, from the external electronic device, the NFT to which the ownership signature is additionally added,
    wherein the ownership signature is added to the NFT by the external electronic device, in response to execution of user authentication by the external electronic device.

5. The method of claim 1, wherein generating the NFT comprises:
    receiving the target content, including metadata, from the external electronic device; and
    calculating a result value by inputting the received target content including the metadata into a token issuance function for issuing NFTs.

6. The method of claim 1, further comprising:
    in response to receiving a request to verify the NFT, verifying the ownership signature included in the NFT to identify an owner of the NFT.

7. The method of claim 6, wherein identifying of the owner of the NFT further comprises:
    identifying the owner of the NFT based on stored ownership history information that is mapped to the target content; and
    verifying the ownership signature included in the NFT using a certificate corresponding to the identified owner.

8. The method of claim 1, further comprising:
    in response to receiving the request to purchase the NFT from the second external electronic device, transmitting the NFT to the second external electronic device for removal of the ownership signature and addition of a new ownership signature indicative of a new owner; and
    receiving, from the second external electronic device, the NFT to which the new ownership signature is added indicative of the new owner.

9. The method of claim 1, further comprising:
    in response to receiving the request to purchase the NFT from the second external electronic device associated with another user, transmitting the NFT to the second external electronic device for addition of a new ownership signature of the other user while maintaining the ownership signature of the user; and
    receiving, from the second external electronic device, the NFT to which the new ownership signature of the other user is added while the ownership signature of the user that is maintained.

10. The method of claim 8, further comprising:
    verifying the new ownership signature of the other user included in the NFT using a public key associated with the other user;
    in response to successfully verifying the new ownership signature included in the NFT, transmitting the NFT to the second external electronic device for update of the ownership signature; and
    receiving transmission of the NFT with the updated ownership signature from the second external electronic device, and storing the NFT with the updated ownership signature, in absence of communicative transmissions related to the update with the remainder of the plurality of NFT-related external electronic devices.

11. A non-transitory computer-readable storage medium storing instructions that, when executed by a processor, cause an electronic device managing non-fungible token (NFT) transactions in absence of a blockchain to execute steps, comprising:
    generating, via at least one processor, an NFT for target content in response to receiving a request to register the target content from a first external electronic device;
    generating, for addition to the NFT, a certification authority (CA) signature indicating that the NFT is generated by the electronic device;
    transmitting, via a communication circuitry, the NFT to the first external electronic device, wherein an ownership signature is added to the NFT, together with the CA signature, the ownership signature based on a private key of a user to which ownership of the NFT is assigned; and
    in response to receiving, from a second external electronic device from among a plurality of NFT-related external electronic devices, a request to purchase the NFT, processing, via the at least one processor and the second external electronic device, a transfer of the NFT from a preceding owner to a new owner, in absence of communicative transmissions related to the transfer with a remainder of the plurality of NFT-related external electronic devices.

12. An apparatus for managing a non-fungible token (NFT) transactions in absence of a blockchain, the apparatus comprising:
    a memory configured to store computer-executable instructions; and
    a processor, communicable coupled to the memory, wherein the computer-executable instructions are executable by the processor to cause the apparatus to:
generate the NFT for target content, in response to receiving a request to register the target content from a first external electronic device,
generate a certification authority (CA) signature for addition to the NFT, indicating that the NFT is generated by the apparatus,
transmit, via a communication circuitry, the NFT to the first external electronic device, wherein an ownership signature is added to the NFT, together with the CA signature, the ownership signature based on a private key of a user to which ownership of the NFT is assigned, and
in response to receiving, from a second external electronic device from among a plurality of NFT-related external electronic devices, a request to purchase the NFT, processing, via the processor and the second external electronic device, a transfer of the NET from a preceding owner to a new owner, in absence of communicative transmissions related to the transfer with a remainder of the plurality of NFT-related external electronic devices.

13. The apparatus of claim 12, wherein the processor is configured to:
generate a user account based on user information received from the first external electronic device, wherein the NFT for the target content is generated after the user account is authenticated by the first external electronic device.

14. The apparatus of claim 13, wherein generating of the user account includes transmitting a certificate, to which the CA signature is added, to the first external electronic device, in response to receiving a certificate signing request (CSR) generated based on a public key of the user from the first external electronic device.

15. The apparatus of claim 12, wherein generating the NFT further comprises:
after transmitting the NFT to which the CA signature is added to the external electronic device, receiving, from the external electronic device, the NFT to which the ownership signature is additionally added,
wherein the ownership signature is added to the NFT by the external electronic device, in response to execution of user authentication by the external electronic device.

16. The apparatus of claim 12, wherein generating the NFT comprises:
receiving the target content, including metadata, from the external electronic device; and
calculating a result value by inputting the received target content including the metadata into a token issuance function for issuing NFTs.

17. The apparatus of claim 12, wherein the processor is configured to:
in response to receiving a request to verify the NFT, verify the ownership signature included in the NFT to identify an owner of the NFT.

18. The apparatus of claim 17, wherein identifying of the owner of the NFT further comprises:
identifying the owner of the NFT based on stored ownership history information that is mapped to the target content; and
verifying the ownership signature included in the NFT using a certificate corresponding to the identified owner.

19. The apparatus of claim 12, wherein the processor is configured to:
in response to receiving the request to purchase the NFT from the second external electronic device, transmit the NFT to the second external electronic device for removal of the ownership signature and addition of a new ownership signature indicative of a new owner; and
receive, from the second external electronic device, the NFT for which the ownership signature is removed, and for which the new ownership signature is added indicative of the new owner.

20. The apparatus of claim 12, wherein the processor is further configured to:
in response to receiving the request to purchase the NFT from the second external electronic device associated with another user, transmitting the NFT to the second external electronic device for additionally adding a new ownership signature of the other user alongside the ownership signature of the user which is maintained; and
receiving, from the second external electronic device, the NFT for which the new ownership signature of the other user is added, while the ownership signature of the user is maintained.

* * * * *